(12) United States Patent
Venkataraman

(10) Patent No.: US 11,908,013 B2
(45) Date of Patent: *Feb. 20, 2024

(54) METHODS, APPARATUS, AND SYSTEMS FOR PROCESSING DATA TRANSACTIONS

(71) Applicant: Nasdaq Technology AB, Stockholm (SE)

(72) Inventor: Kandan Venkataraman, Sydney (AU)

(73) Assignee: Nasdaq Technology AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,463

(22) Filed: Mar. 1, 2022

(65) Prior Publication Data

US 2022/0188928 A1 Jun. 16, 2022

Related U.S. Application Data

(63) Continuation of application No. 16/560,027, filed on Sep. 4, 2019, now Pat. No. 11,295,383, which is a continuation of application No. 16/375,955, filed on Apr. 5, 2019, now Pat. No. 10,504,183, which is a continuation of application No. 13/447,463, filed on Apr. 16, 2012, now Pat. No. 10,262,365.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC .................................................... G06Q 40/04
See application file for complete search history.

(56) References Cited

U.S. PATENT DOCUMENTS

| | | | |
|---|---|---|---|
| 4,750,135 | A | 6/1988 | Boilen |
| 4,809,168 | A | 2/1989 | Hennessy et al. |
| 5,003,473 | A | 3/1991 | Richards |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,195,031 | A | 3/1993 | Ordish |
| 5,195,100 | A | 3/1993 | Katz et al. |
| 5,260,866 | A | 11/1993 | Lisinski et al. |

(Continued)

FOREIGN PATENT DOCUMENTS

| | | |
|---|---|---|
| EP | 0407026 | 1/1991 |
| EP | 1768305 | 3/2007 |

(Continued)

OTHER PUBLICATIONS

"McGowan, Michael J., "The Rise of Computerized High Frequency Trading: Use and Controversy", Duke Law and Technology Review 2010, No. 016" (Year: 2010).*

(Continued)

*Primary Examiner* — Daniel S Felten
*Assistant Examiner* — Kevin T Poe
(74) *Attorney, Agent, or Firm* — NIXON & VANDERHYE P.C.

(57) ABSTRACT

Methods, apparatus, and systems for processing data transactions use a sequencer communicating with a plurality of data processors and provide improved performance and lower latency.

19 Claims, 3 Drawing Sheets

(56) References Cited

U.S. PATENT DOCUMENTS

| | | |
|---|---|---|
| 5,265,006 A | 11/1993 | Asthana et al. |
| 5,297,031 A | 3/1994 | Gutterman et al. |
| 5,412,612 A | 5/1995 | Oyama |
| 5,440,749 A | 8/1995 | Moore et al. |
| 5,592,378 A | 1/1997 | Cameron et al. |
| 5,684,794 A | 11/1997 | Lopez |
| 5,689,652 A | 11/1997 | Lupien et al. |
| 5,696,968 A | 12/1997 | Merkin |
| 5,727,165 A | 3/1998 | Ordish et al. |
| 5,774,879 A | 6/1998 | Custy et al. |
| 5,812,988 A | 9/1998 | Sandretto |
| 5,827,071 A | 10/1998 | Sorensen et al. |
| 5,845,266 A | 12/1998 | Lupien et al. |
| 5,924,082 A | 7/1999 | Silverman et al. |
| 5,924,083 A | 7/1999 | Silverman et al. |
| 5,950,177 A | 9/1999 | Lupien et al. |
| 5,991,739 A | 11/1999 | Cupps |
| 6,012,046 A | 1/2000 | Lupien et al. |
| 6,014,643 A | 1/2000 | Minton |
| 6,016,483 A | 1/2000 | Rickard et al. |
| 6,035,287 A | 3/2000 | Stallaert et al. |
| 6,157,914 A | 12/2000 | Seto et al. |
| 6,192,131 B1 | 2/2001 | Geer, Jr. et al. |
| 6,202,125 B1 | 3/2001 | Patterson et al. |
| 6,247,000 B1 | 6/2001 | Hawkins et al. |
| 6,278,982 B1 | 8/2001 | Korhammer et al. |
| 6,317,726 B1 | 11/2001 | O'Shaughnessy |
| 6,317,728 B1 | 11/2001 | Kane |
| 6,324,647 B1 | 11/2001 | Bowman-Amuah |
| 6,408,000 B1 | 6/2002 | Lamberg et al. |
| 6,442,533 B1 | 8/2002 | Hinkle |
| 6,505,174 B1 | 1/2003 | Keiser et al. |
| 6,601,044 B1 | 7/2003 | Wallman |
| 6,704,601 B1 | 3/2004 | Amely-Velez |
| 6,704,873 B1 | 3/2004 | Underwood |
| 6,871,183 B2 | 3/2005 | Gilday et al. |
| 6,941,280 B1 | 9/2005 | Gastineau et al. |
| 6,983,260 B2 | 1/2006 | Hummelgren |
| 7,010,496 B2 | 3/2006 | Wong |
| 7,080,033 B2 | 7/2006 | Wilton et al. |
| 7,082,133 B1 | 7/2006 | Lor et al. |
| 7,110,975 B2 | 9/2006 | Marks de Chabris et al. |
| 7,127,421 B1 | 10/2006 | Beacham et al. |
| 7,167,844 B1 | 1/2007 | Leong et al. |
| 7,181,424 B1 | 2/2007 | Ketchum et al. |
| 7,184,441 B1 | 2/2007 | Kadambi et al. |
| 7,246,092 B1 | 7/2007 | Peterson et al. |
| 7,246,093 B1 | 7/2007 | Katz |
| 7,249,091 B2 | 7/2007 | Kinney et al. |
| 7,249,139 B2 | 7/2007 | Chuah et al. |
| 7,254,833 B1 | 8/2007 | Cornelius et al. |
| 7,318,045 B2 | 1/2008 | Baecker et al. |
| 7,321,872 B1 | 1/2008 | Kaminsky et al. |
| 7,356,498 B2 | 4/2008 | Kaminsky et al. |
| 7,401,046 B2 | 7/2008 | Hollerman et al. |
| 7,451,108 B1 | 11/2008 | Skuriat et al. |
| 7,496,533 B1 | 2/2009 | Keith |
| 7,552,205 B2 | 6/2009 | Lamb et al. |
| 7,562,032 B2 | 7/2009 | Abbosh et al. |
| 7,610,233 B1 | 10/2009 | Leong et al. |
| 7,653,584 B2 | 1/2010 | Schmitz et al. |
| 7,689,495 B1 | 3/2010 | Kim et al. |
| 7,747,493 B1 | 6/2010 | Monroe |
| 7,921,051 B2 | 4/2011 | Serkin et al. |
| 7,933,827 B2 * | 4/2011 | Richmann ............... G06Q 20/10 705/37 |
| 7,945,508 B2 | 5/2011 | Duquette et al. |
| 7,996,511 B1 | 8/2011 | Wiese et al. |
| 8,266,040 B2 | 9/2012 | Segal et al. |
| 8,271,336 B2 | 9/2012 | Mikurak |
| 8,275,697 B2 | 9/2012 | Monroe |
| 8,290,850 B1 | 10/2012 | Singer |
| 8,924,277 B2 | 12/2014 | Allen et al. |
| 9,141,980 B2 | 9/2015 | Lindner |
| 9,311,673 B2 | 4/2016 | Hughes, Jr. et al. |
| 9,727,916 B1 | 8/2017 | Montesano et al. |
| 10,262,365 B2 | 4/2019 | Venkataraman |
| 10,504,183 B2 | 12/2019 | Venkataraman |
| 11,157,999 B2 | 10/2021 | Hughes et al. |
| 2001/0034686 A1 | 10/2001 | Eder |
| 2002/0013735 A1 | 1/2002 | Arora et al. |
| 2002/0013760 A1 | 1/2002 | Arora et al. |
| 2002/0046152 A1 | 4/2002 | Kinney et al. |
| 2002/0099647 A1 | 7/2002 | Howorka et al. |
| 2002/0138401 A1 | 9/2002 | Allen et al. |
| 2002/0156716 A1 | 10/2002 | Adatia |
| 2002/0198820 A1 | 12/2002 | Mills |
| 2003/0009413 A1 | 1/2003 | Furbush et al. |
| 2003/0065601 A1 | 4/2003 | Gatto |
| 2003/0065604 A1 | 4/2003 | Gatto |
| 2003/0083973 A1 | 5/2003 | Horsfall |
| 2003/0110107 A1 | 6/2003 | Hiatt, Jr. et al. |
| 2003/0140027 A1 | 7/2003 | Huttel et al. |
| 2003/0216926 A1 | 11/2003 | Scotto et al. |
| 2003/0225671 A1 | 12/2003 | Miller et al. |
| 2003/0225672 A1 | 12/2003 | Hughes et al. |
| 2003/0225673 A1 | 12/2003 | Hughes, Jr. et al. |
| 2003/0225674 A1 | 12/2003 | Hughes, Jr. et al. |
| 2003/0229557 A1 | 12/2003 | Richmann et al. |
| 2003/0229566 A1 | 12/2003 | Moore et al. |
| 2003/0229567 A1 | 12/2003 | Serkin et al. |
| 2003/0229568 A1 | 12/2003 | Richmann et al. |
| 2004/0034591 A1 | 2/2004 | Waelbroeck et al. |
| 2004/0143542 A1 | 7/2004 | Magill et al. |
| 2004/0193526 A1 | 9/2004 | Singer et al. |
| 2005/0074033 A1 | 4/2005 | Chauveau |
| 2006/0059082 A1 | 3/2006 | Silverman et al. |
| 2007/0198397 A1 | 8/2007 | McGinley et al. |
| 2008/0040221 A1 * | 2/2008 | Wiseman ............... G06Q 30/0277 705/37 |
| 2008/0172321 A1 | 7/2008 | Bartko |
| 2010/0332371 A1 | 12/2010 | Jensen et al. |
| 2011/0066538 A1 | 3/2011 | Liberman et al. |
| 2011/0178919 A1 * | 7/2011 | Parsons ................. G06Q 40/00 705/37 |
| 2011/0251942 A1 | 10/2011 | Rosenthal et al. |
| 2012/0239549 A1 | 9/2012 | Setz |
| 2012/0246052 A1 | 9/2012 | Taylor |
| 2017/0053349 A1 * | 2/2017 | Peck-Walden ......... G06Q 40/04 |

FOREIGN PATENT DOCUMENTS

| | | |
|---|---|---|
| WO | 95/18418 | 7/1995 |
| WO | 98/12659 | 3/1998 |
| WO | 98/41942 | 9/1998 |
| WO | 99/40511 | 8/1999 |
| WO | 00/26834 | 5/2000 |
| WO | 01/17182 | 3/2001 |
| WO | 02/43326 | 5/2002 |
| WO | 02/095638 | 11/2002 |
| WO | 2006/076329 | 7/2006 |
| WO | 2011000662 | 1/2011 |

OTHER PUBLICATIONS

Hendershott Terrence, Riordan Ryan, "Algorithmic Trading and Information", Department of Economics and Business Engineering Karlsruhe Institute of Technology, 2011 (Year: 2011).*

"Latterman, Christoph, High Frequency Trading Costs and Benefits in Securities Trading and its Necessity of Regulations, Business & Information System Engineering, 2012 Fed, pp. 93-102" (Year: 2012).*

U.S. Appl. No. 16/560,027, filed Sep. 4, 2019, Venkataraman.

Final Office Action dated Oct. 12, 2021 for U.S. Appl. No. 16/560,027, 14 pages.

Office Action dated May 5, 2021 for U.S. Appl. No. 16/560,027, 14 pages.

Office Action dated Jul. 9, 2020 for U.S. Appl. No. 16/560,027, 14 pages.

International Search Report dated Dec. 19, 2013 in International Application No. PCT/SE2013/050382.

(56) References Cited

OTHER PUBLICATIONS

Written Opinion of the International Searching Authority dated Dec. 19, 2013 in International Application No. PCT/SE2013/050382.
R. Freund et al., A Scheduling Framework for Heterogeneous Computing, Parallel Architectures, Algorithms, and Networks, 1996, Proceedings., Second International Symposium on Beijing, China Jun. 12-14, 1996, pp. 1-9.
McGowan, Michael J., "The Rise of Computerized High Frequency Trading: Use and Controversy" Duke Law and Technology Review 2010, No. 016, 2010.
Hendershott Terrence, Riordan Ryan, "Algorithmic Trading and Information" Department of Economics and Business Engineering Karlsruhe Institute of Technology, 2011, Jun. 2011.
Latterman, Christoph, "High Frequency Trading Costs and Benefits in Securities Trading and its Necessity of Regulations" Business & Information System Engineering, 2012 Fed, pp. 93-102, 2012.
Editorial Staff, Traders Magazine, "Facing A new reality: The SIA Conference addressing changing technology needs in a changing world" New York: Jun. 1, 2002, 5 pages.
"What is Main Memory" From http://www.webopedia.com/TERM/M/main_memory.html retrieved on Jan. 30, 2008, 3 pages.
"Computer Data Storage" From http://en.wikipedia.org/wiki/computer_storage retrieved on Jan. 30, 2008, 11 pages.
"RAM: A Brief Introduction" from http://www.linfo.org/ram.html retrieved on Jan. 30, 2008, 3 pages.
"Cache" John Wiley & Sons Ltd, Dictionary of Multimedia and Internet Applications: A Guide for Developers and Users, 1999, retrieved by xreferplus.com on Apr. 21, 2007, 3 pages.
Petition for Covered Business Method Patent Review filed with the PTAB Jul. 20, 2018 in Covered Business Method Review No. CBM2018-00038, directed to U.S. Pat. No. 7,895,112 (88 pages) with Exhibits 1001-1034.
Patent Owner's Preliminary Response filed with the PTAB Oct. 25, 2018 in Covered Business Method Review No. CBM2018-00038, directed to U.S. Pat. No. 7,895,112 (60 pages) with Exhibits 2001-2003.
Patent Trial and Appeal Board Decision Denying Institution of Covered Business Method Patent Review entered Jan. 22, 2019 in Covered Business Method Review No. CBM2018-00038, directed to U.S. Pat. No. 7,895,112, 12 pages.
Petition for Covered Business Method Patent Review filed with the PTAB Aug. 24, 2018 in Covered Business Method Review No. CBM2018-00041, directed to U.S. Pat. No. 8,244,622 (95 pages) with Exhibits 1001-1035.
Patent Owner's Preliminary Response filed with the PTAB Nov. 29, 2018 in Covered Business Method Review No. CBM2018-00041, directed to U.S. Pat. No. 8,244,622 (69 pages) with Exhibits 2001-2007.
Patent Owner's Brief Addressing Revised Patent Subject Matter Eligibility Guidelines filed with the PTAB Feb. 1, 2019 in Covered Business Method Review No. CBM2018-00041, directed to U.S. Pat. No. 8,244,622, 8 pages.
Petitioner's Brief Regarding 2019 Revised Patent Subject Matter Eligibility Guidance filed with the PTAB Feb. 1, 2019 in Covered Business Method Review No. CBM2018-00041, directed to U.S. Pat. No. 8,244,622, 8 pages.
Petitioner's Brief In Response to the Expert Declaration of Mr. Peter U. Vinella filed with the PTAB Feb. 7, 2019 in Covered Business Method Review No. CBM2018-00041, directed to U.S. Pat. No. 8,244,622, 8 pages.
Petition for Covered Business Method Patent Review filed with the PTAB Sep. 14, 2018 in Covered Business Method Review No. CBM2018-00042, directed to U.S. Pat. No. 8,386,362 (90 pages) with Exhibits 1001-1037.
Patent Owner's Preliminary Response filed with the PTAB Dec. 28, 2018 in Covered Business Method Review No. CBM2018-00042, directed to U.S. Pat. No. 8,386,362 (64 pages) with Exhibits 2001-2007.

Patent Owner's Brief Addressing Revised Patent Subject Matter Eligibility Guidelines filed with the PTAB Feb. 1, 2019 in Covered Business Method Review No. CBM2018-00042, directed to U.S. Pat. No. 8,386,362, 8 pages.
Petitioner's Brief Regarding 2019 Revised Patent Subject Matter Eligibility Guidance filed with the PTAB Feb. 1, 2019 in Covered Business Method Review No. CBM2018-00042, directed to U.S. Pat. No. 8,386,362, 8 pages.
Petitioner's Brief In Response to the Expert Declaration of Mr. Peter U. Vinella filed with the PTAB Feb. 7, 2019 in Covered Business Method Review No. CBM2018-00042, directed to U.S. Pat. No. 8,386,362, 8 pages.
Petition for Covered Business Method Patent Review filed with the PTAB Apr. 2, 2018 in Covered Business Method Review No. CBM2018-00032, directed to U.S. Pat. No. 7,933,827 (58 pages) with Exhibits 1001-1033.
Patent Owner's Preliminary Response filed with the PTAB Aug. 15, 2018 in Covered Business Method Review No. CBM2018-00032, directed to U.S. Pat. No. 7,933,827 (72 pages) with Exhibits 2001-2004.
Patent Owner's Request for Rehearing filed with the PTAB Nov. 28-29, 2018 in Covered Business Method Review No. CBM2018-00032, directed to U.S. Pat. No. 7,933,827, 16 pages.
Patent Owner's Contingent Motion to Amend filed with the PTAB Jan. 28, 2019 in Covered Business Method Review No. CBM2018-00032, directed to U.S. Pat. No. 7,933,827, 35 pages.
Patent Owner's Response Under 37 C.F.R. § 42.120 filed with the PTAB Jan. 28, 2019 in Covered Business Method Review No. CBM2018-00032, directed to U.S. Pat. No. 7,933,827 (95 pages) with Exhibits 2001-2030.
Patent Trial and Appeal Board Decision Instituting Covered Business Method Review entered Nov. 14, 2018 in Covered Business Method Review No. CBM2018-00032, directed to U.S. Pat. No. 7,933,827, 29 pages.
Petition for Covered Business Method Patent Review filed with the PTAB Jul. 26, 2018 in Covered Business Method Review No. CBM2018-00039, directed to U.S. Pat. No. 7,933,827 (108 pages) with Exhibits 1001-1048.
Patent Owner's Preliminary Response filed with the PTAB Nov. 29, 2018 in Covered Business Method Review No. CBM2018-00039, directed to U.S. Pat. No. 7,933,827 (80 pages) with Exhibits 2001-2010.
Petitioner's Brief Regarding 2019 Revised Patent Subject Matter Eligibility Guidance filed with the PTAB Feb. 1, 2019 in Covered Business Method Review No. CBM2018-00039, directed to U.S. Pat. No. 7,933,827, 8 pages.
Patent Owner's Brief Addressing Revised Patent Subject Matter Eligibility Guidelines filed with the PTAB Feb. 1, 2019 in Covered Business Method Review No. CBM2018-00039, directed to U.S. Pat. No. 7,933,827, 8 pages.
Petition for Covered Business Method Patent Review filed with the PTAB Mar. 29, 2018 in Covered Business Method Review No. CBM2018-00030, directed to U.S. Pat. No. 7,921,051 (64 pages) with Exhibits 1001-1033.
Patent Owner's Preliminary Response Pursuant to 37 C.F.R. § 42.107 filed with the PTAB Jul. 19, 2018 in Covered Business Method Review No. CBM2018-00030, directed to U.S. Pat. No. 7,921,051 (60 pages) with Exhibits 2001-2004.
Patent Owner's Response Pursuant to 37 C.F.R. § 42.120 filed with the PTAB Jan. 14, 2019 in Covered Business Method Review No. CBM2018-00030, directed to U.S. Pat. No. 7,921,051 (93 pages) with Exhibits 2001-2024.
Patent Owner's Contingent Motion to Amend filed with the PTAB Jan. 15, 2019 in Covered Business Method Review No. CBM2018-00030, directed to U.S. Pat. No. 7,921,051, 31 pages.
Patent Trial and Appeal Board Decision Instituting Covered Business Method Patent Review entered Oct. 5, 2018 in Covered Business Method Review No. CBM2018-00030, directed to U.S. Pat. No. 7,921,051, 29 pages.
Petitioners' Opposition to Patent Owner's Motion to Amend filed with the PTAB Apr. 16, 2019 in Covered Business Method Review No. CBM2018-00030, directed to U.S. Pat. No. 7,921,051 (31 pages) with Exhibits 1001-1118.

(56) References Cited

OTHER PUBLICATIONS

Patent Owner's Reply to Petitioners' Opposition to Patent Owner's Contingent Motion to Amend filed with the PTAB May 21, 2019 in Covered Business Method Review No. CBM2018-00030, directed to U.S. Pat. No. 7,921,051 (19 pages) with Exhibits 2001-2042.

Petitioners' Opposition to Patent Owner's Motion to Amend filed with the PTAB Apr. 12, 2019 2018 in Covered Business Method Review No. CBM2018-00032, directed to U.S. Pat. No. 7,933,827 (34 pages) with Exhibits 1001-1118.

Patent Owner's Reply to Petitioners' Opposition to Patent Owner's Contingent Motion to Amend filed with the PTAB May 17, 2019 in Covered Business Method Review No. CBM2018-00032, directed to U.S. Pat. No. 7,933,827 (20 pages) with Exhibits 2001-2045.

Patent Trial and Appeal Board Decision Denying Institution of Covered Business Method Patent Review entered Feb. 22, 2019 in Covered Business Method Review No. CBM2018-00041, directed to U.S. Pat. No. 8,244,622 (14 pages).

Patent Trial and Appeal Board Decision Denying Institution Covered Business Method Patent Review entered Mar. 18, 2019 in Covered Business Method Review No. CBM2018-00042, directed to U.S. Pat. No. 8,386,362 (16 pages).

Patent Owner's Contingent Motion to Amend filed with the PTAB Jun. 3, 2019 in Covered Business Method Review No. CBM2018-00039, directed to U.S. Pat. No. 7,933,827 (73 pages) with Exhibits 2001-2027.

Defendants IEX Group, Inc. and Investors Exchange LLC's Answer to Plaintiffs' Amended Complaint for Patent Infringement (Document 56) filed with the United States District Court for the District of New Jersey Feb. 26, 2019 in Civil Action No. 3:18-cv-03014, directed to U.S. Pat. Nos. 7,647,264; 7,933,827; 8,117,609; 8,244,622; 8,280,797; and 8,386,362 (144 pages).

Plaintiffs Nasdaq, Inc. and Nasdaq Technology AB's Memorandum of Law in Support of Motion to Dismiss Inequitable Conduct Counterclaim (Document 66-2) filed with the United States District Court for the District of New Jersey Mar. 29, 2019 in Civil Action No. 3:18-cv-03014, directed to U.S. Pat. Nos. 8,244,622; 8,386,362; and 7,895,112 (36 pages).

Defendants IEX Group, Inc. and Investors Exchange LLC's Memorandum in Opposition to Nasdaq's Motion to Dismiss IEX's Inequitable Conduct Counterclaim (Document 69) filed with the United States District Court for the District of New Jersey May 6, 2019 in Civil Action No. 3:18-cv-03014, directed to U.S. Pat. Nos. 7,647,264; 7,933,827; 8,117,609; 8,244,622; 8,280,797; and 8,386,362 (44 pages).

Plaintiffs' Reply Memorandum of Law in Further Support of Their Motion to Dismiss Defendants' Inequitable Conduct Counterclaim (Document 76) filed with the United States District Court for the District of New Jersey May 24, 2019 in Civil Action No. 3:18-cv-03014, directed to U.S. Pat. Nos. 8,244,622; 8,386,362; and 7,895,112 (21 pages).

Patent Trial and Appeal Board Final Written Decision, Feb. 25, 2020, in Covered Business Method Review No. CBM2018-00039, directed to U.S. Pat. No. 7,933,827 (60 pages).

Patent Trial and Appeal Board Final Written Decision, Nov. 13, 2019, in Covered Business Method Review No. CBM2018-00032, directed to U.S. Pat. No. 7,933,827 (44 pages).

Patent Trial and Appeal Board Final Written Decision, Oct. 3, 2019, in Covered Business Method Review No. CBM2018-00030, directed to U.S. Pat. No. 7,921,051 (43 pages).

* cited by examiner

METHODS, APPARATUS, AND SYSTEMS FOR PROCESSING DATA TRANSACTIONS

This application is a continuation of U.S. patent application Ser. No. 16/560,027, filed Sep. 4, 2019, which is a continuation of U.S. patent application Ser. No. 16/375,955, filed Apr. 5, 2019 (now U.S. Pat. No. 10,504,183), which is a continuation of U.S. patent application Ser. No. 13/447,463, filed Apr. 16, 2012 (now U.S. Pat. No. 10,262,365), the entire contents of each of which are hereby incorporated by reference in this application.

TECHNICAL FIELD

Embodiments of the present invention presented herein generally relate to a method and a computerized exchange system for processing orders.

BACKGROUND

When trading shares and/or other financial instruments in a computerized exchange, the computerized exchange is generally configured to receive trade orders to create a trade. For instance, the computerized exchange is generally configured to receive bid orders and ask orders and match the bid orders and the ask orders to create a trade. Depending on the conditions associated with the trade, the processes of matching bid and ask orders can sometimes be complex.

Current computerized exchanges normally comprise a central matching engine, typically residing within a central server, and a plurality of gateways, or distributed servers. In such computerized exchange, the typical process can be as follows: order entry messages are received by the computerized exchange, e.g. bid orders and/or ask orders, sent from client devices, e.g. trader terminals, are received via the gateways at the central server. The computerized exchange processes the order entry messages. This processing in the computerized exchange, e.g. central server, may include, among other things, performing order matching based on the received order entry messages. The order processing acknowledgement output from the central server is then typically returned to the client devices via the gateway that forwarded the transaction. The gateway may be required to perform additional processing before the acknowledgement data is returned to the client device. The central server will also disseminate the information from the order message, either in the same form as received or otherwise, to the multiple gateways which perform processing of the order entry information to generate market data output. The market data output is typically forwarded to all client devices through a variety of communication mechanisms, requiring additional processing in the gateways.

This means that a single order entry message firstly requires processing in the central server and then requires reprocessing many times over and in parallel across the various gateway servers.

SUMMARY

In view of the above, an improved method and computerized exchange system would be advantageous and, in particular, a method and computerized exchange system allowing for lower latency and/or improved throughput.

It is therefore a general object of some embodiments of the present invention to provide for an improved method for processing trade orders, which method provides for lower latency and/or higher throughput.

According to an aspect, there is provided a method for processing trade orders. The method is performed by a computerized exchange system. The method comprises: receiving at least one order entry message at at least one of a plurality of order book engines; sending the at least one order entry message from the at least one order book engine to a sequencer; receiving, at the sequencer, the at least one order entry message from the at least one order book engine; sequencing, in the sequencer, the received at least one order entry message by assigning status data and a sequence number to the order entry message for thereby putting incoming order entry messages assigned with different status data in a sequenced order; sending, from the sequencer, the at least one order entry message in a sequenced order to the plurality of order book engines; receiving, at the plurality of order book engines, the at least one order entry message; and processing in substantially parallel, in the plurality of order book engines, the at least one order entry message.

In this method, there is no central server performing many operations or performing relatively demanding operations such as performing order matching based on incoming order entry messages. Instead, a sequencer is used for performing comparatively less demanding operations, such as only the sequencing of received order entry messages by assigning status and sequence number data to the order entry messages and sending the order entry messages in a sequenced order to the plurality of order book engines. The sequencer does not perform as many or any demanding operations that are generally performed by the central server in the current computer exchange systems described in the background. Compared to the computerized exchange system described in the background, the sequencer in this method therefore allows for a lower latency because of reduced processing time in the sequencer compared to the comparatively longer processing time in the previous central server.

Furthermore, in this method the processing of order entry messages is only done in the plurality of order book engines. Compared to the computerized exchange system described in the background, the processing of the order entry message information is not repeated in both a central server and, subsequently, in various gateways. (E.g. the data sent from the central server may in many cases be in a different payload but it will essentially be the order entry information, if not the same message in shape and content.) Rather, the processing of the order entry message information is performed only in the plurality of order book engines. Since the processing of order entry messages is not duplicated, the latency can be reduced. Also, this may allow for higher throughput.

Since the order entry messages are received in a sequenced order (e.g. time stamped) at the plurality of order book engines, the processing of the order entry messages is performed in substantially parallel by the multiple order book engines.

In one embodiment, the processing of the at least one order entry message is performed in all order book engines of the plurality of order book engines.

The processing in substantially parallel in the plurality of order book engines may comprise processing essentially the same at least one order entry message in all of the plurality of order book engines at essentially the same time and with the same logic. This way, all order book engines process the same data. In other words, the computational operations in the respective order book engines are based on the same or essentially the same data and with the same processing logic.

In one embodiment, each of the plurality of order book engines performs additional tasks that are specific to the individual order book engine. In this way, rather than performing all additional tasks in all of the order book engines, each order book engine is individually configured to perform a specific and smaller subset of tasks. For example, one order book engine may process the order entry message to create order management information for outputting to a corresponding client device. Additionally, or alternatively, another order book engine of the plurality of order book engines may process the order entry message to create market data for outputting to a corresponding client device. In one embodiment, the at least one order entry message relates to an order having a hidden volume and at least one of the order book engines processes the at least one order entry message relating to an order having a hidden volume. By having several order book engines, each of which is specifically designed for performing only specific tasks it is possible to reduce the number of computational operations in each of the order book engines. This allows for avoiding unnecessary data processing overhead. Further, this allows for improved overall performance of the computerized exchange system, e.g. in terms of lower latency and/or higher throughput.

In one embodiment, the step of receiving at least one order entry message at one of a plurality order book engines comprises receiving the at least one order entry message from a client device associated with said one of the plurality of order book engines.

In one embodiment, assigning status data comprises assigning a time stamp and a sequence number to the at least one order entry message.

In one embodiment, sequencing the received at least one order entry message comprises recording the at least one order entry message.

It is also a general object of some embodiments of the present invention to provide for an improved computerized exchange system for processing trade orders, which computerized exchange system provides for lower latency and/or higher throughput According to a second aspect, there is provided a computerized exchange system for processing trade orders. The computerized exchange system comprises a sequencer and a plurality of order book engines. The sequencer comprises: a communication interface; a processor; and a memory storing a computer program comprising computer program code which, when run on the processor of the sequencer, causes the sequencer to: receive, via the communication interface, at least one order entry message from at least one of a plurality of order book engines; sequence the received at least one order entry message by assigning status data to the order entry message for thereby putting incoming order entry messages assigned with different status data in a sequenced order; and sending, via the communication interface, the at least one order entry message to the plurality of order book engines. Each of the plurality of order book engines comprises: a communication interface; a processor; and a memory storing a computer program comprising computer program code which, when run on the processor of the order book engine, causes the order book engine to: receive, via the communication interface, the at least one order entry message from the sequencer; and process the at least one order entry message in substantially parallel with the other order book engines of the plurality of order book engines.

The plurality of order book engines may be configured to process essentially the same at least one order entry message in all of the plurality of order book engines at essentially the same time.

In one embodiment, at least one of the plurality of order book engines comprises a memory storing a computer program comprising computer program code which, when run on the processor of the at least one order book engine, causes the at least one order book engine to: receive, via the communication interface, at least one order entry message from a client device associated with the at least one order book engine; and send, via the communication interface, the at least one order entry message from the at least one order book engine to the sequencer.

In one embodiment, each of the plurality of order book engines is configured to perform a task that is specific to the individual order book engine. For example, at least one order book engine may be configured to process the order entry message to create order management data for outputting to a corresponding client device. At least one order book engine may be configured to process the order entry message to create market data for outputting to a corresponding client device. In one embodiment, the at least one order entry message relates to an order having a hidden volume and at least one of the order book engines is configured to process the at least one order entry message relating to an order having a hidden volume.

In one embodiment, the memory storing a computer program comprising computer program code which, when run on the processor of the sequencer, further comprises: computer program code which, when run on the processor of the sequencer, causes the sequencer to assign a time stamp and a sequence number to the at least one order entry message.

In one embodiment, the memory storing a computer program comprising computer program code which, when run on the processor of the sequencer, further comprises: computer program code which, when run on the processor of the sequencer, causes the sequencer to record the at least one order entry message.

The computerized exchange system according to various embodiments of the second aspect provides for one or more of the advantages and/or effects mentioned with respect to the first aspect.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of invention to those persons skilled in the art. Like numbers refer to like elements throughout the description.

Figure 1:
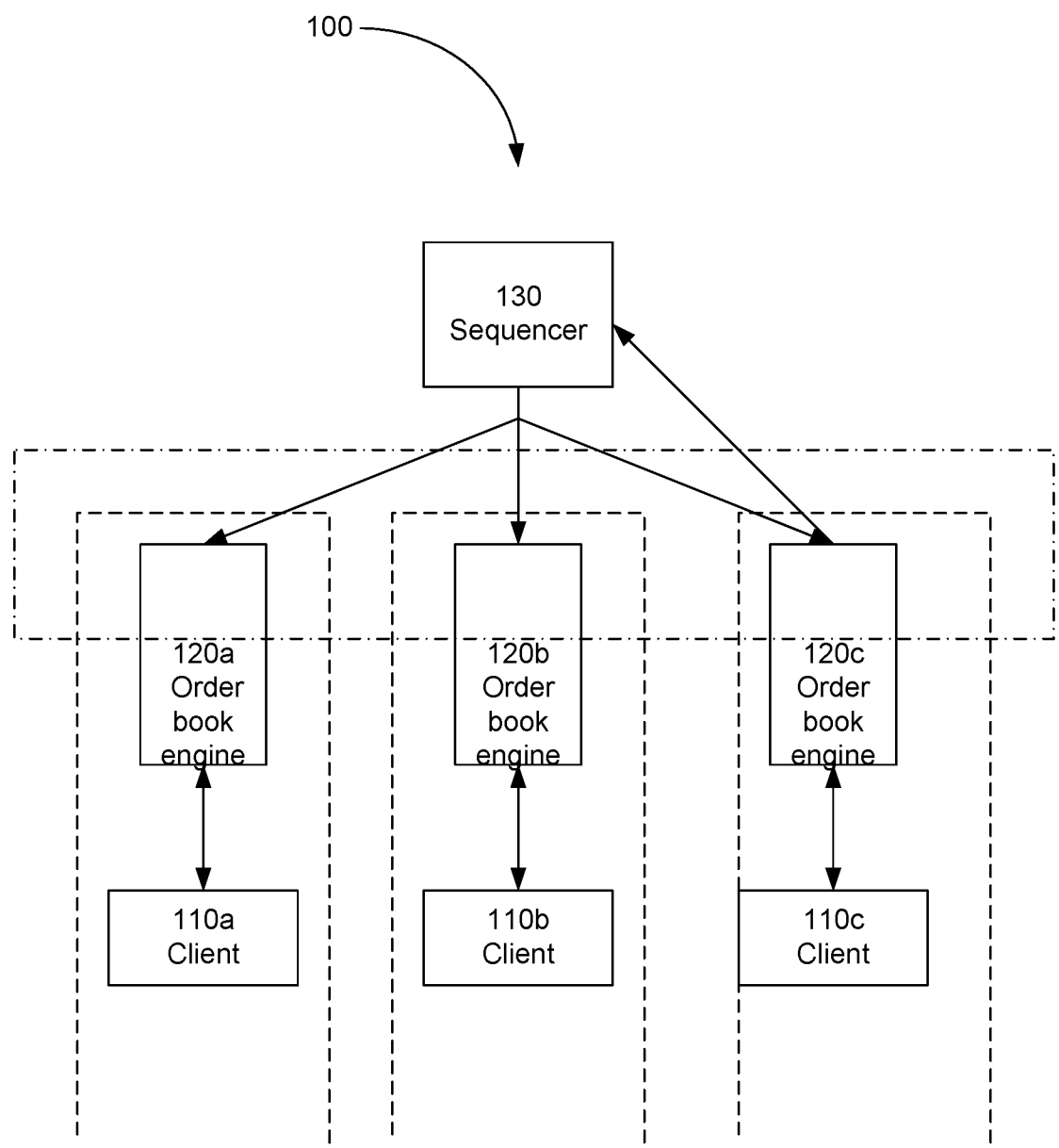
FIG. 1 is a schematic diagram illustrating a computerized exchange system according to an exemplary embodiment of the invention.

An example trading environment is illustrated in FIG. 1. With reference to FIG. 1, an example embodiment of a computerized, or automated, exchange 100 according to embodiments of the invention is discussed.

A number of clients 110 or client devices herein denoted client 110a, client 110b, and client 110c are operable to communicate with the exchange 100. Thus, traders or market participants can participate on the market by means of the clients 110a-c communicating with the computerized exchange 100 e.g. via a communication network. More particularly, the client devices 110a-c are operable to communicate with order book engines (also known as matching engines) 120a-c. In the disclosed embodiment, client device 110a can communicate with order book engine 120a, client device 110b can communicate with order book engine 120b and so forth. The clients 110a-c may connect to its respective order book engine in any known manner, such as via high speed data lines, high speed communication servers or via the Internet to mention only a few examples. Data lines, e.g. high speed data lines, may establish direct connection between the client 110a-c and the respective order book engines 120a-c. Connection can, additionally or alternatively, be established between the client 110a-c and the order book engines 120a-c by configuring networks, e.g. high speed networks, or communication servers at strategic access points in locations where traders are physically located. The Internet is a third communications means enabling traders using clients 110a-c using data connections connected to the Internet. Consequently, traders can be located anywhere and at any time establish a connection with the computerized exchange system 100.

As is illustrated in FIG. 1, the computerized exchange 100 comprises a sequencer 130, or central sequencer, and a plurality of order book engines 120a-c. The plurality of order book engines 120a-c may be mirrors of each other in terms of hardware and/or software. The order book engines 120a-c are configured to maintain order books. An order book can be maintained in any known manner and how order books are maintained will therefore not be further explained here. In contrast to current computerized exchanges described in the background, the exemplary computerized exchange 100 illustrated in FIG. 1 comprises no central server having a central order book. Instead, the order books are distributed such that each of the several order book engines maintains their respective order books. Also in contrast to current computerized exchanges, the illustrated computerized exchange 100 comprises no central server performing the many different operations as is done in current exchanges described in the background section. Rather, the exemplary computerized exchange of FIG. 100 comprises a sequencer, which performs considerably fewer operations compared to the previous central server. In particular, and as will be further detailed herein, the sequencer 130 is configured to receive order entry messages from an order book engine, sequence the received order entry messages, e.g. by assigning status data to the order entry messages, for thereby putting incoming order entry messages assigned with different status data in a sequenced order, and subsequently sending the order entry messages to the plurality of order book engines.

With reference to FIG. 1, an exemplary trading process will be described. An order entry message, e.g. in the form of a bid order or an ask order, is sent from a client device, e.g. client device 110c, to an order book engine 120c. The order book engine 120c receives 210 the order entry message(s) and forwards 211, i.e. sends, the order entry message(s) to the sequencer 130. The sequencer 130 then receives 212 the forwarded order entry message(s). Subsequently, the sequencer 130 sequences 213 the received order entry message(s) by assigning status data, e.g. by assigning a time stamp, to the order entry message(s) for thereby putting incoming order entry messages assigned with different status data in a sequenced order. The sequencer may also record incoming order entry messages. Thereafter, the sequencer 130 broadcasts 214, i.e. sends, order entry messages in a sequenced order to the plurality order book engines 120a-c. The order book engines 120a-c thereafter receives 215 the order entry messages from the sequencer 130 in parallel and at substantially the same time. Upon receiving the order entry messages in the sequenced order from the sequencer 130, the plurality of order book engines processes 216 the order entry messages in substantially parallel. By introducing a sequencer 130, or a central sequencer, and utilizing parallel processing of order entry messages in a plurality of order book engines 120a-c it is possible to reduce the number of processing steps in the transaction round-trip compared to current computerized exchange systems described in the background. Thereby, the latency can be decreased.

The processing in substantially parallel in the plurality of order book engines 120a-c may comprise processing essentially the same order entry messages in all of the plurality of order book engines 120a-c at essentially the same time. This way, all order book engines 120a-c can process the same or essentially the same data. In other words, the computational operations in the respective order book engines 120a-c are based on the same or essentially the same data.

In one embodiment, each of the plurality of order book engines performs a task that is specific to the individual order book engine 120a-c. In this way, rather than performing many different tasks in each of the order book engines 120a-c, each order book engine may be individually configured to perform only one task (or only a few tasks). For example, one order book engine 120a may process order entry messages to create order management data (for example, according to the OUCH protocol) for outputting to a corresponding client device 110a. Another order book engine 120b may process order entry messages to create market data (e.g. according to the ITCH protocol) for outputting to a corresponding client device. Yet another order book engine may be specially designed for processing order entry messages of a type having a hidden volume, as described in the U.S. Pat. No. 6,983,260. By having several order book engines, each of which is specifically designed for performing specific tasks it is possible to reduce the number of computational operations in each of the order book engines 120a-c. This allows for avoiding unnecessary data processing overhead. Further, this allows for improved overall performance of the computerized exchange system, e.g. in terms of lower latency and/or higher throughput.

Figure 2:
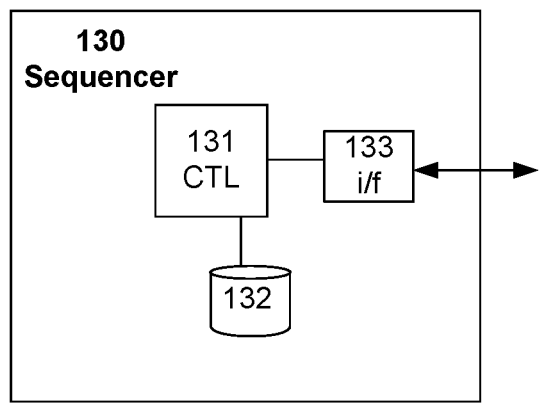
FIG. 2 is a schematic diagram illustrating some modules of an embodiment of a sequencer illustrated in FIG. 1.

FIG. 2 is a schematic diagram illustrating some modules of an embodiment of the sequencer 130 illustrated in FIG. 1. A processor 131 is provided using any suitable central processing unit (CPU), microcontroller, digital signal processor (DSP), etc., capable of executing computer program comprising computer program code, the computer program being stored in a memory 132. The memory 132 can be any combination of read and write memory (RAM) and read only memory (ROM). The memory may also comprise persistent storage, which, for example, can be any single one or combination of magnetic memory, optical memory, or solid state memory or even remotely mounted memory. The sequencer 130 further comprises a communication interface 133 arranged for communication with the order book engines 133 and, optionally, additional devices. For example, the sequencer 133 may be arranged for communication using the known User Datagram Protocol (UDP). With UDP, the sequencer 131 can send (and receive) messages, sometimes referred to as datagrams, to other devices on an Internet Protocol (IP) network without requiring prior communications to set up special transmission channels or data paths. UDP uses a simple transmission model without implicit handshaking dialogues for providing reliability, ordering, or data integrity.

The sequencer 131 is arranged to receive order entry messages via its communication interface 133 from order book engines. Furthermore, the sequencer 131 is arranged to send, via its communication interface 133, order entry messages that have been sequenced by means of the sequencer 131 to order book engines.

In one embodiment, when the above-mentioned stored computer program code is run in the processor 131, this causes the sequencer 131 to receive, via its communication interface 133, one or more order entry messages from at least one of the plurality of order book engines; sequence the received order entry message(s) by assigning status data, e.g. assigning a time stamp, to the order entry message(s) for thereby putting incoming order entry messages assigned with different status data in a sequenced order; and sending, via the communication interface 133, the order entry message(s) to the plurality of order book engines in a sequenced order. Optionally, the sequencing also comprises recording the order entry message(s), e.g. in memory 132.

Figure 3:
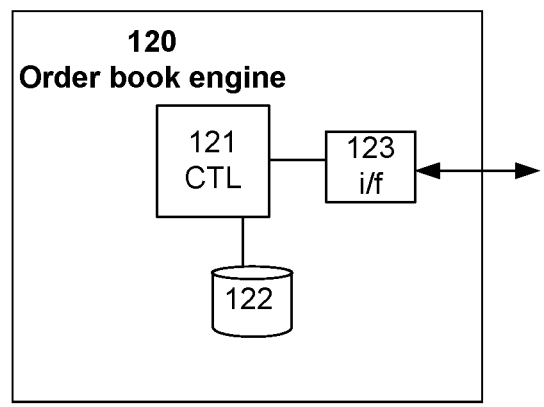
FIG. 3 is a schematic diagram illustrating some modules of an embodiment of an order book engine illustrated in FIG. 1.

FIG. 3 is a schematic diagram illustrating some modules of an embodiment of one of the order book engines 120a-c illustrated in FIG. 1. The different order book engines 120a-c may be mirrors of each other in terms of hardware and/or software and so the various order book engines 120a-c comprise the same or essentially the same or similar components. A processor 121 is provided using any suitable central processing unit (CPU), microcontroller, digital signal processor (DSP), etc., capable of executing computer program comprising computer program code, the computer program being stored in a memory 122. The memory 122 can be any combination of read and write memory (RAM) and read only memory (ROM). The memory may also comprise persistent storage, which, for example, can be any single one or combination of magnetic memory, optical memory, or solid state memory or even remotely mounted memory. The order book engine 120 further comprises a communication interface 123 arranged for communication with the sequencer 130. Also, the communication interface may be arranged for communication with respective client devices associated with the order book engine in question. For example, the order book engine 120 may be arranged for communication using the known User Datagram Protocol (UDP). With UDP, the order book engine 121 can receive (and/or send) messages, sometimes referred to as datagrams, to other devices on an Internet Protocol (IP) network without requiring prior communications to set up special transmission channels or data paths.

In one embodiment, when the above-mentioned stored computer program code is run in the processor 121, this causes the order book engine 121 to receive, via the communication interface 123, one or more order entry message(s) from the sequencer 130; and process order entry message(s) in substantially parallel with the other order book engines of the plurality of order book engines.

In some embodiments, the several order book engines 120a-c illustrated in FIG. 1 are configured to process essentially the same order entry message(s) in all of the plurality of order book engines 120a-c at essentially the same time.

At least one of the plurality of order book engines shown in FIG. 1 additionally comprises a memory 122 storing a computer program comprising computer program code which, when run on the processor of this order book engine, causes this order book engine to: receive, via the communication interface 123, an order entry message(s) from a client device associated with this order book engine; and send, via the communication interface 123, the order entry message(s) from this order book engine to the sequencer 130.

Each order book engine 120 is configured to perform a task that is specific to the individual order book engine 120. In this way, rather than performing many different tasks in each of the order book engines 120a-c, each order book engine may be individually configured to perform only one task (or, at least only very few tasks). For example, one order book engine 120a may be specially configured to process order entry messages to create order management data (for example, according to the OUCH protocol) for outputting to a corresponding client device 110a. Another order book engine 120b may be particularly configured to process order entry messages to create market data (e.g. according to the ITCH protocol) for outputting to a corresponding client device. Yet another order book engine may be specially designed for processing order entry messages of a type having a hidden volume, as described in the U.S. Pat. No. 6,983,260. By having several order book engines, each of which is specifically designed for performing specific tasks it is possible to reduce the number of computational operations in each of the order book engines 120a-c.

Figure 4:
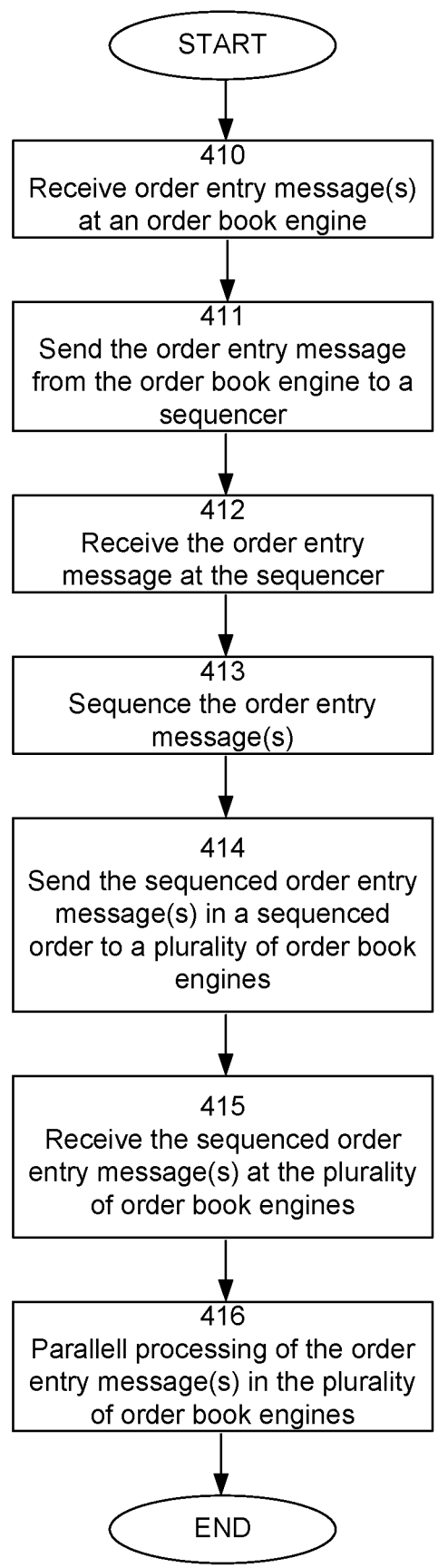
FIG. 4 is flow chart illustrating a method according to an embodiment of the invention.

FIG. 4 is a flow chart illustrating a method according to one embodiment executed in a computerized exchange system. The method illustrated in FIG. 2 allows for one or more of the advantages and/or effects mentioned with respect to the computerized exchange system 100 described in connection with FIGS. 1, 2 and 3. In an initial step 410, an order book engine receives an order entry message. The order book engine may receive the order entry message from a client device associated with the plurality of order book engines, e.g. a client device denoted 110c which is associated with order book engine 120c. Next, the order book engine forwards, i.e. sends, the order entry message to a sequencer in a step 411. In the subsequent step 412, the sequencer receives the forwarded order entry message. The sequencer then sequences the order entry message in step 413. This is done by assigning status data to the order entry message for thereby putting incoming order entry messages assigned with different status data in a sequenced order. For example, assigning status data to the order entry message may comprise assigning a time stamp to the order entry message. Additionally, or alternatively, the sequencing may comprise recording the order entry message. After the step 413 of sequencing, the sequencer broadcasts, i.e. sends, the order entry message to the plurality of order book engines in step 414. Since incoming order entry messages are assigned with status data, e.g. in the form of time stamps, these can be sent to the order book engines in a sequenced order. Or, alternatively, the order book engines can put incoming order entry messages in the correct, or proper, order in dependence of the assigned status data. In step 415, the order entry message is received by the plurality of order book engines, preferably but not necessarily by all order book engines. In a final step 416, the order entry message(s) is/are processed in substantially parallel in the plurality of order book engines. In step 416, all order book engines may process essentially the same order entry message(s) at essentially the same time.

Also when implementing the method illustrated in FIG. 4, each of the plurality of order book engines may perform certain tasks that are specific to the individual order book engines as described hereinabove with respect to FIGS. 1, 2 and 3, respectively.

Various embodiments of the invention described hereinabove allow for reduced latency and/or higher throughput. Some embodiments can allow for a reduction in latency from 800 ms to 40 ms compared to the current exchange systems described in the background section. This is a considerable improvement for computerized exchange systems. Thus, various embodiments of the present invention meet the continuous demand from traders and others for lower latency and better performance of computerized exchange systems.

Although the present invention has been described above with reference to specific embodiments, it is not intended to be limited to the specific form set forth herein. Rather, the invention is limited only by the accompanying claims and, other embodiments than the specific above are equally possible within the scope of the appended claims. Also, when used herein the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method for processing electronic order entry messages, the method being performed on a computerized exchange including a gateway and comprising:
   receiving, by a plurality of order book engines via the gateway, a plurality of electronic order entry messages;
   sending, by the plurality of order book engines, the plurality of electronic order entry messages to a central sequencer that is coupled to the plurality of order book engines;
   receiving, by the central sequencer, the plurality of electronic order entry messages from the plurality of order book engines and assigning, by the central sequencer, a time stamp to each of the plurality of electronic order entry messages;
   placing, by the central sequencer, the plurality of electronic order entry messages in a sequence according to the assigned time stamps;
   sending, by the central sequencer, the plurality of electronic order entry messages to the plurality of order book engines;
   receiving, by a first order book engine of the plurality of order book engines and a second order book engine of the plurality of order book engines, the plurality of electronic order entry messages;
   processing, by the first order book engine, the plurality of electronic order entry messages in the sequence, wherein the processing by the first order book engine includes creating order management data that comprises order acceptance, rejection, execution, or cancellation information;
   outputting, by the first order book engine, the order management data;
   processing, by the second order book engine, substantially in parallel to the processing by the first order book engine, the plurality of electronic order entry messages in the sequence, wherein the processing by the second order book engine includes creating market data, wherein the market data comprises order addition or modification information; and
   outputting, by the second order book engine, the market data.

2. The method according to claim 1, wherein the plurality of order book engines and the central sequencer each comprise one or more hardware processors, one or more hardware communication interfaces, and one or more memories.

3. The method according to claim 1, wherein the processing the plurality of electronic order entry messages in the sequence by the first order book engine and the second order book engine comprises processing essentially the same electronic order entry messages of the plurality of electronic order entry messages in the sequence at the same time.

4. The method according to claim 1, further comprising:
   performing one or more tasks, by each of the plurality of order book engines, specific to the respective order book engine.

5. The method according to claim 1, wherein receiving the plurality of electronic order entry messages comprises recording, in non-volatile memory, the electronic order entry messages.

6. The method according to claim 1, further comprising:
   the first order book engine formatting the order management data according to the OUCH protocol, and
   the second order book engine formatting the order management data according to the ITCH protocol.

7. The method according to claim 1, wherein at least one of the plurality of electronic order entry messages relates to an order having a hidden order volume.

8. The method according to claim 1, further comprising:
   receiving, by a third order book engine of the plurality of order book engines, the plurality of electronic order entry messages;
   processing, by a third order book engine, substantially in parallel to the processing by the first order book engine, the plurality of electronic order entry messages in the sequence, wherein the processing includes creating market data, wherein the market data comprises order addition or modification information; and
   outputting the market data.

9. A computerized exchange system, comprising:
   a gateway;
   a plurality of order book engines configured to:
      receive via the gateway a plurality of electronic order entry messages, and
      send the plurality of electronic order entry messages to a central sequencer that is coupled to the plurality of order book engines;
   a central sequencer configured to:
      receive the plurality of electronic order entry messages from the plurality of order book engines and assigning a time stamp to each of the plurality of electronic order entry messages;
      place the received plurality of electronic order entry messages in a sequence according to the assigned time stamps;
      send the plurality of electronic order entry messages to the plurality of order book engines;

a first order book engine of the plurality of order book engines, the first order book engine configured to:
receive the plurality of electronic order entry messages;
process the plurality of electronic order entry messages in the sequence, wherein the processing by the first order book engine includes creating order management data that comprises order acceptance, rejection, execution, or cancellation information; and
output the order management data;
a second order book engine of the plurality of order book engines, the second order book engine configured to:
receive the plurality of electronic order entry messages;
process, substantially in parallel to the processing by the first order book engine, the plurality of electronic order entry messages in the sequence, wherein the processing by the second order book engine includes creating market data, wherein the market data comprises order addition or modification information; and
output the market data.

10. The computerized exchange system according to claim 9, wherein the central sequencer comprises:
a central sequencer hardware communication interface;
a central sequencer processor; and
a central sequencer memory storing a sequencer computer program comprising sequencer computer program code,
wherein the first order book engine comprises:
a first hardware communication interface;
a first data processor; and
a first memory storing a first computer program comprising first computer program code,
wherein the second order book engine comprises:
a second hardware communication interface;
a second data processor; and
a second memory storing a second computer program comprising second computer program code.

11. The computerized exchange system according to claim 9, wherein each of the plurality of order book engines is for performing a task specific to a respective order book.

12. A computer system, comprising:
a gateway;
a plurality of order book engines, where each of the plurality of order book engines comprises a data processor and memory storing executable instructions that when executed by the data processor causes the data processor to perform the steps of:
receiving, via the gateway, a plurality of electronic order entry messages, and
sending the plurality of electronic order entry messages to a central sequencer that is coupled to the plurality of order book engines;
a central sequencer comprising a central sequencer a central sequencer processor, and a central sequencer memory storing executable instructions that when executed by the central sequencer processor causes the central sequencer processor to perform the steps of:
receiving the plurality of electronic order entry messages from the plurality of order book engines and assigning a sequence number to each of the plurality of electronic order entry messages;
placing the received plurality of electronic order entry messages in a sequence according to the assigned sequence number;
sending the plurality of electronic order entry messages to the plurality of order book engines;
wherein the memory of a first order book engine of the plurality of order book engines stores executable instructions, that when executed by the data processor of the first order book engine, causes the data processor of the first order book engine to perform the steps of:
receiving the plurality of electronic order entry messages;
processing the plurality of electronic order entry messages in the sequence, wherein the processing includes creating order management data that comprises order acceptance, rejection, execution, or cancellation information; and
outputting the order management data;
wherein the memory of a second order book engine of the plurality of order book engines stores executable instructions, that when executed by the data processor of the second order book engine, causes the data processor of the second order book engine to perform the steps of:
receiving the plurality of electronic order entry messages;
processing, substantially in parallel to the processing by the first order book engine, the plurality of electronic order entry messages in the sequence, wherein the processing includes creating market data, wherein the market data comprises order addition or modification information; and
outputting the market data.

13. The computer system according to claim 12, wherein the processing the plurality of electronic order entry messages in the sequence by the first order book engine and the second order book engine comprises processing essentially the same electronic order entry messages of the plurality of electronic order entry messages in the sequence at the same time.

14. The computer system according to claim 12, wherein the memory of the first order book engine comprises executable instructions that when executed by the data processor of the first order book engine causes the data processor of the first order book engine to perform a step of formatting the order management data according to the OUCH protocol.

15. The computer system according to claim 12, wherein the memory of the second order book engine comprises executable instructions that when executed by the data processor of the second order book engine causes the data processor of the second order book engine to perform a step of formatting the order management data according to the ITCH protocol.

16. The computer system according to claim 12, wherein at least one of the plurality of electronic order entry messages relates to an order having a hidden order volume.

17. The computer system according to claim 12, wherein the sending, by the central sequencer, the plurality of electronic order entry messages to the plurality of order book engines comprises sending the plurality of electronic order entry messages using the User Datagram Protocol (UDP).

18. The computer system according to claim 12, wherein the sending, by the central sequencer, the plurality of electronic order entry messages, to the plurality of order book engines comprises sending the plurality of electronic order entry messages using the Internet Protocol (IP).

19. The computer system according to claim 12, further comprising:
a third order book engine of the plurality of order book engines, wherein the memory of the third order book engine stores for executable instructions, that when executed by the data processor of the third order book engine, causes the data processor of the third order book engine to perform the steps of:

receiving the plurality of electronic order entry messages;

processing, substantially in parallel to the processing by the first order book engine, the plurality of electronic order entry messages in the sequence, wherein the processing includes creating market data, wherein the market data comprises order addition or modification information; and outputting the market data.

\* \* \* \* \*